United States Patent [19]

Sayles

[11] Patent Number: 4,698,106
[45] Date of Patent: Oct. 6, 1987

[54] METHOD FOR THE MANUFACTURE OF OXIDIZERS OF VERY LARGE SURFACE AREA AND THEIR USE IN HIGH BURNING RATE PROPELLANTS

[75] Inventor: David C. Sayles, Huntsville, Ala.

[73] Assignee: The United States of America as represented by the Secretary of the Army, Washington, D.C.

[21] Appl. No.: 210,267

[22] Filed: Dec. 16, 1971

[51] Int. Cl.$^4$ ............................................. C06B 45/34
[52] U.S. Cl. ........................................ 149/7; 149/76; 423/476; 428/372; 428/403
[58] Field of Search ................. 423/476; 149/2, 7, 76; 428/372, 403

[56] References Cited

U.S. PATENT DOCUMENTS

| | | | |
|---|---|---|---|
| 3,190,776 | 6/1965 | Ender | 149/7 X |
| 3,291,659 | 12/1966 | Yancik | 149/2 |
| 3,388,014 | 6/1968 | Russo | 149/2 X |
| 3,539,377 | 10/1970 | Steinle | 149/7 X |
| 4,115,166 | 9/1978 | Lista et al. | 149/7 |

OTHER PUBLICATIONS

"Propellant Binders for Composite Fuels", *Chem Abstracts*, vol. 72, 1970, ABS 81003a, p. 139.

*Primary Examiner*—Stephen J. Lechert, Jr.
*Attorney, Agent, or Firm*—Anthony T. Lane; Jack W. Voigt; Werten F. W. Bellamy

[57] ABSTRACT

Solid oxidizer particles of ultrahigh surface area are produced by an etching process which includes employing selective extractants in a process which causes the formation of indentations and/or cavities on the surfaces of the oxidizer particles, and crevasses and tunnels in the oxidizer particles. The method is particularly attractive for manufacturing ultrahigh surface area ammonium perchlorate which has limited solubility in the extractants ethanol, butanol, or a mixture of these extractants.

3 Claims, 1 Drawing Figure

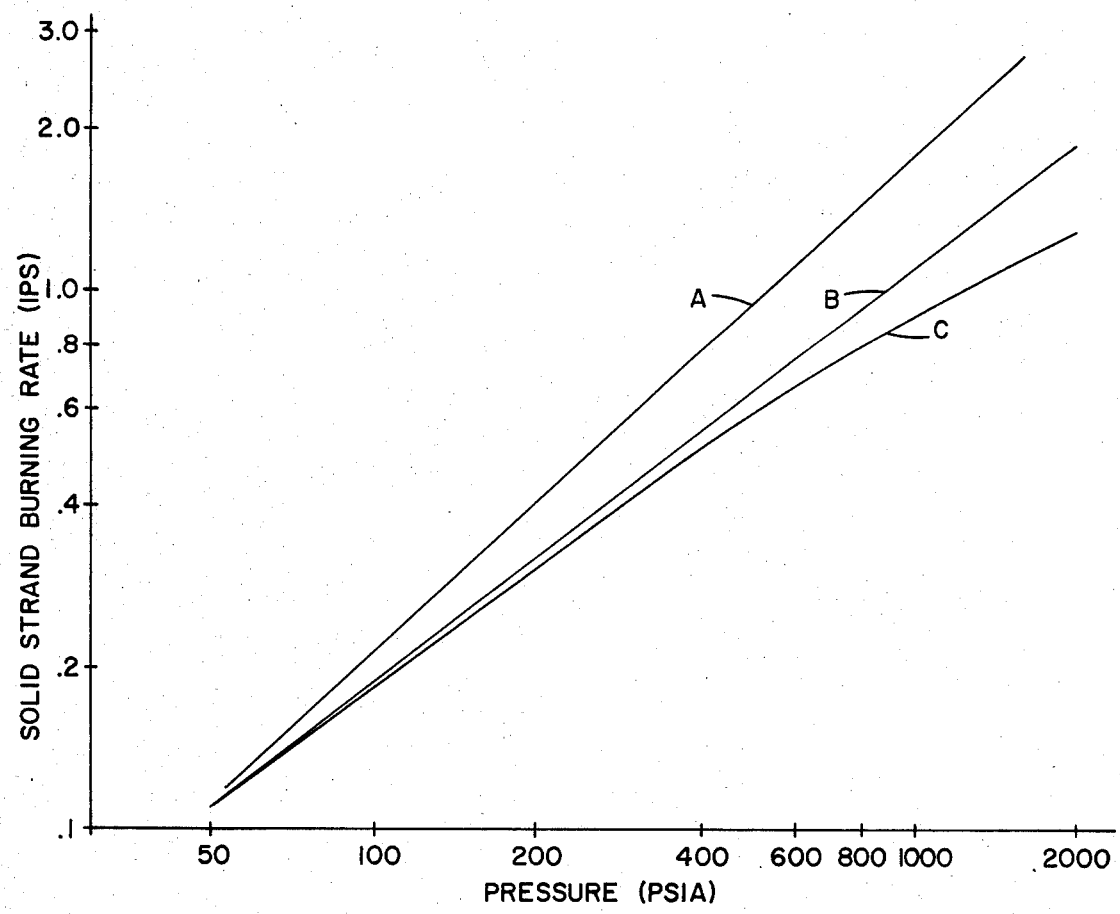

METHOD FOR THE MANUFACTURE OF OXIDIZERS OF VERY LARGE SURFACE AREA AND THEIR USE IN HIGH BURNING RATE PROPELLANTS

BACKGROUND OF THE INVENTION

The interest in oxidizers which have unusually large surface areas results from the emergence, within recent years, of newer performance requirements, specified for advanced interceptor missiles. These performance requirements have required ultrahigh burning-rate propellants.

The efforts to meet the high performance requirements of ultrahigh burning-rate propellants have been concentrated mainly on the use of a combination of combustion catalyst (such as ferrocenyl or carboranyl derivatives) in conjunction with fine forms of oxidizer. High burning-rate composite-modified double-base propellants have also been developed by using fine oxidizer in conjunction with metallic fibers or staples.

Presently, ammonium perchlorate of high surface area, is manufactured by two processes. These processes relate to:

1. Ultrafine ammonium perchlorate, or submicron size that is manufactured by a grind process involving the use of a Vibroenergy mill.

2. Porous ammonium perchlorate that is produced by the thermal decomposition of ammonium perchlorate. This process can be carried out at 300°-400° F. until a weight loss of about 28% takes place.

Advantageous would be a process of manufacturing ultrahigh surface area ammonium perchlorate particles wherein the ammonium perchlorate which is removed during the pore forming procedure is recoverable and can be recycled, thereby resulting in a more economical process.

Also advantageous would be a manufacturing process for making porous ammonium perchlorate which has superior properties for promoting propellant burning rate and which can be used in place of ultrafine ammonium perchlorate, of either the small-micron or submicron size, prepared by a grinding process or porous ammonium perchlorate prepared by a thermal decomposition process.

An object of this invention is to provide a method of manufacture for solid oxidizers hving a very large surface area.

Another object of this invention is to provide a method of manufacture for solid oxidizers which method yields a product having superior properties for promoting propellant burning rate, a product which can be used in place of ultrafine oxidizer, of either the small micron particle size or submicron particle size prepared by a grinding process or porous oxidizer prepared by a thermal decomposition process.

A further object of the method of this invention is to employ an etching process in the pore forming procedure on and within the oxidizer paricles which process facilitates the recovery of the oxidizer which is dissolved by the selective extractants that are used to cause etching which results in the formation of indentations and/or cavities on the surfaces of the oxidizer particles and crevasses and tunnels in the oxidizer particles. The result of the etching process is a large increase in the surface area of the oxidizer particles.

SUMMARY OF THE INVENTION

Ultrahigh surface-area ammonium perchlorate oxidizer is prepared by treating thermally-shocked ammonium perchlorate (TSAP) with a selective extractant (e.g. n-butanol) which causes the formation of indentation and/or cavities on the surfaces of the oxidizer particles, and crevasses and tunnels in the oxidizer particle. The thermally-shocked ammonium perchlorate is prepared by subjecting unground ammonium perchlorate to a heating and sudden cooling procedure which causes the development of micro-cracks on the surfaces of the ammonium perchlorate and within the ammonium perchlorate. The selective extractant causes an increase in the surface area of the ammonium perchlorate as indentation and/or cavities, crevasses and tunnels are formed as the etching by the selective extractant takes place preferentially at the micro cracks. The final result is an ultrahigh surface area ammonium perchlorate with highly-pitted surfaces in which the pits have a rather large length-to-width ratio and are oriented with their long sides parallel to one another and have an appearance reminiscent of terraced pyramids.

The ultrahigh surface area ammonium perchlorate (UHSAAP) is employed as an oxidizer for a propellant composition. Comparison tests indicate that UHSAAP can be used as a direct replacement for porous ammonium perchlorate in a propellant formulation to yield improved physical properties, improved burning rates, and improved performance of a controllable propellant.

BRIEF DESCRIPTION OF THE DRAWING

The drawing illustrates by graphic comparison, the burning rates at various pressures of a propellant employing ultrahigh surface area ammonium perchlorate prepared by the method of this invention, a propellant employing porous ammonium perchlorate of the prior art, and a control propellant employing a standard blend of ammonium perchlorate.

DESCRIPTION OF THE PREFERRED EMBODIMENT

Ultrahigh-surface-area ammonium perchlorate (UHSAAP) is prepared by the following procedure:

Unground ammonium perchlorate whose mean weight diameter is of the order of 180-microns is subjected to thermal shock by heating it to 150° C., and then cooling it rapidly. Under these conditions the ammonium perchlorate crystals develop micro-cracks.

The thermally-shocked ammonium perchlorate (TSAP) is transferred to a Soxhlet extractor where it is subjected to extraction using n-butanol as the extractant for a period of 4 hours. The TSAP (100 grams) is transferred to a container which contains divinylbenzene (10 grams) dissolved in n-hexane (400 ml), and vigorously stirred for 1 hour. The divinylbenzene-coated, ultrahigh-surface-area ammonium perchlorate (UHSAAP) is separated by filtration, and desiccated under reduced pressure until all of the solvent is removed.

The ammonium perchlorate that is removed by the extractant n-butanol can be recovered for recycling by standard procedures. This recovery of AP results in a savings over the thermal decomposition method.

The UHSAAP is converted into a controllable propellant. The propellant is compared with a propellant using porous ammonium perchlorate (PAP) which had been prepared by the controlled thermal decomposition (300°–450° F.) of ammonium perchlorate until a weight loss of 28% had taken place.

Reference to the accompanying drawings are made wherein solid strand burning rates are plotted against pressures to compare the burning rates of Propellants A, B, and C; Propellant A being a propellant using an oxidizer blend of UHSAAP 70% and 30%, 180-micron ammonium perchlorate; Propellant B being a prior art propellant using an oxidizer blend of 70%, 3-micron AP, and 30%, 180-micron porous ammonium perchlorate; and Propellant C being a control prior art propallant using an oxidizer blend of 70%, 3-micron AP, and 30%, 180-micron AP.

The drawing illustrates the effect of finely-ground, porous, and ultrahigh-surface-area ammonium perchlorate on the pressure exponent and pressure deflagration limit of a controllable propellant.

Table I sets forth the ingredients in weight percent of propellant formulations D and E which further illustrate the comparison of ultrahigh surface-area-ammonium perchlorate formulation E, with porous ammonium perchlorate, formulation D. All ingredients were held constant except for the oxidizer blends which in formulation D consisted of a find blend AP, 8-micron (22%) and 3-micron (33%) in combination with about 10 weight percent of porous ammonium perchlorate (180-micron) prepared by a thermal decomposition method while formulation E consisted of the same percentage of fine blend as in formulation D, in combination with the ultrahigh-surface-area ammonium perchlorate of this invention which is in an amount of about 10 weight percent.

TABLE 1

| INGREDIENT | Propellant D (Weight %) | Propellant E (Weight %) |
|---|---|---|
| Ammonium Perchlorate | 55 | 55 |
| 8-micron (22%) | | |
| 3-micron (33%) | | |
| Porous Ammonium Perchlorate (180-micron) | 10 | — |
| Ultrahigh Surface Area Ammonium Perchlorate (180-micron) | — | 10 |
| Aluminum Flake (Alcoa - 609) | 1 | 1 |
| Aluminum Spheroidal Powder (H-95) (95-micron) | 18 | 18 |
| Ammonium Dihydrogen Phosphate (12-micron) | 1 | 1 |
| *Silon S (1-micron) | 0.5 | 0.5 |
| Ferric Acetylacetonate/Acetylacetic Acid | 0.09 | 0.09 |
| Sulfur | 0.05 | 0.05 |
| Isodecyl Pelargonate | 5.80 | 5.80 |
| Polypropylene Adduct of Trimethylolpropane | 4.37 | 4.37 |
| Polypropylene Glycol | 1.65 | 1.65 |
| Bis(2-cyanoethyl)-2,3-propanediolamine | 0.05 | 0.05 |
| Hexamethylene Diisocyanate | 0.98 | 0.98 |
| Processing Aid | 1.51 | 1.51 |
| Ballistic Properties | | |
| Specific Impulse (lbf-sec/lbm) (1000/14.7 psia, 0° half angle) | 248 | 248 |
| Specific Weight (lbm/cm³) | 0.0626 | 0.0629 |
| Burning Rate (ips) (@ 2000 psia) | 2.8 | 3.2 |
| Pressure Exponent of Burning Rate (100–2000 psia) | 0.84 | 0.95 |
| Mechanical Properties | | |
| Tensile Strength (psi) | 136 | 154 |
| Strain at Maximum Stress (%) | 26 | 37 |
| Strain at Break (%) | 29 | 32 |
| Modulus of Elongation (psi) | 745 | 815 |
| Extinguishment Properties | | |
| Motor Extinguishment | 73/500 | 97/500 |
| Pressure/L-Star** (psia/in) | 45/800 | 62/800 |

*Polyamide synthetic fiber
**Free Volume/Throat Area

When one reviews the data at the bottom of Table I, one recognizes the following benefits from propellant E:
1. Improved burning rate;
2. Improved physical properties for:
   a. Tensile Strength (psi)
   b. Strain at Maximum Stress (%)
   c. Strain at Break (%)
   d. Modulus of Elongation (psi); and
3. Improved properties:
   a. Motor Extinguishment Pressure L-Star** (psia/in).
**Free Volume/Throat Area Although the examples provided covers the oxidizer ammonium perchlorate, the method of this invention is applicable to other oxidizers. The success of the etching process disclosed is dependent upon selecting an etch solution whose solvency characteristics are sufficiently low for the oxidizer being etched to provide a degree of control on the amount of the oxidizer that is removed by the etch process to increase the surface area of oxidizer.

I claim:
1. A method for the manufacture of ultrahigh-surface-area ammonium perchlorate comprising the steps of:
   subjecting unground ammonium perchlorate to thermal shock by heating to about 150° C. and then cooling rapidly to yield thermally-shocked ammonium perchlorate;
   treating said thermally shocked ammonium perchlorate with a selective extractant selected from ethanol, n-butanol, and mixtures of ethanol and butanol to perform multiple extractions for a predetermined period of time which causes the formation of indentations and/or cavities on the surfaces of the thermally shocked ammonium perchlorate and crevasses and tunnels in the thermally-shocked ammonium perchlorate;
   coating the ammonium perchlorate that has been treated by selective extractants with a n-hexane solution of divinylbenzene; and thereafter,
   separating said ultrahigh-surface-area ammonium perchlorate.
2. The method of claim 1 wherein said selective extractant is n-butanol and said multiple extractions are performed for a predetermined period of time of about four hours.
3. An oxidizer for ultrahigh-burning rate propellant comprising divinylbenzene-coated ultrahigh-surface-area ammonium perchlorate that is prepared from unground ammonium perchlorate crystals whose mean weight diameter is of the order of 180 microns, said crystals having been subjected to thermal shock by heating to about 150° C. and followed by rapid cooling to yield thermally-shocked ammonium perchlorate crystals having micro-cracks on the surfaces thereof, said thermally-shocked ammonium perchlorate crystals subsequently subjected to a selective extraction process which employs selective extractants having limited solubility for ammonium perchlorate to cause an etch- ing to take place preferentially at said micro-cracks which causes an increase in the surface area of the ammonium perchlorate and which extraction process yields ultrahigh-surface area ammonium perchlorate, said ultrahigh-surface area ammonium perchlorate having indentations and cavities on the surfaces and crevasses and tunnels within said ultrahigh-surface area ammonium perchlorate, said ultrahigh-surface area ammonium perchlorate being coated with divinylbenzene to yield divinylbenzene-coated ultrahigh-surface area ammonium perchlorate that is characterized by having a thin coating of divinylbenzene over highly-pitted surfaces in which the pits have a rather large length-to-width ratio with said pits being oriented with their long sides substantially parallel to one another and having an appearance reminiscent of terraced pyramids.

* * * * *